United States Patent
Yokokura

(10) Patent No.: US 8,689,057 B2
(45) Date of Patent: Apr. 1, 2014

(54) NETWORK APPARATUS, CONTROL METHOD THEREFOR, AND STORAGE MEDIUM

(75) Inventor: Hidenori Yokokura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 69 days.

(21) Appl. No.: 12/365,020

(22) Filed: Feb. 3, 2009

(65) Prior Publication Data

US 2009/0204857 A1 Aug. 13, 2009

(30) Foreign Application Priority Data

Feb. 12, 2008 (JP) ................................ 2008-030421

(51) Int. Cl.
*G06F 11/00* (2006.01)
(52) U.S. Cl.
USPC ................ 714/48; 714/25; 714/4.1; 714/47.1
(58) Field of Classification Search
USPC .................... 714/6, 48, 4.1, 25, 47.1
See application file for complete search history.

(56) References Cited

U.S. PATENT DOCUMENTS

| 2005/0134893 A1* | 6/2005 | Han ............................ 358/1.14 |
| 2005/0246577 A1* | 11/2005 | Okuhara et al. .................. 714/6 |
| 2007/0127063 A1* | 6/2007 | Fertlitsch et al. ............. 358/1.15 |
| 2009/0119545 A1* | 5/2009 | Pham et al. ..................... 714/39 |

FOREIGN PATENT DOCUMENTS

| JP | 2002-261799 A | 9/2002 |
| JP | 2004-362012 A | 12/2004 |

* cited by examiner

Primary Examiner — Sarai Butler
(74) Attorney, Agent, or Firm — Canon USA Inc IP Division

(57) ABSTRACT

In a network apparatus for receiving a processing request transmitted from an external apparatus connected thereto via a network, it is detected that processing corresponding to the transmitted processing request has not been performed. If it is detected that the processing corresponding to the transmitted processing request has not been performed, a port number of a request destination of the transmitted processing request is recognized and an application corresponding to the recognized port number is specified as an application of a request destination of the transmitted processing request. Furthermore, it is determined whether the specified application is in an ON or OFF state. If it is detected that the processing corresponding to the transmitted processing request has not been performed and the specified application is in the OFF state, error information including information indicating the specified application is output.

18 Claims, 7 Drawing Sheets

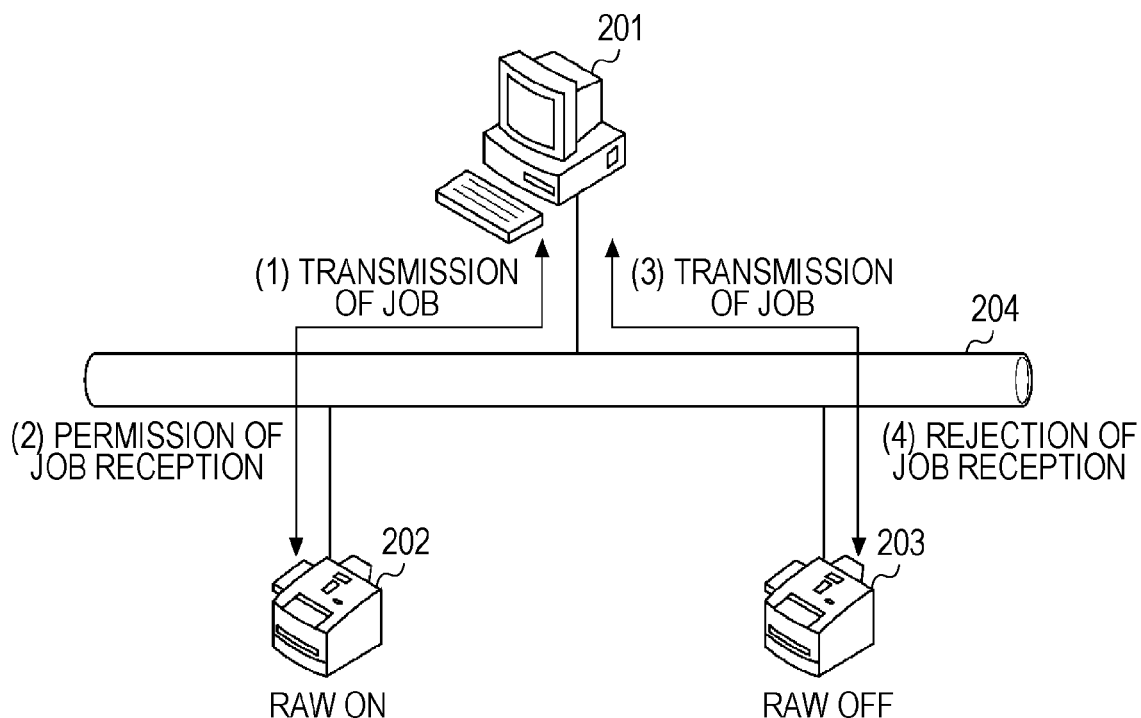

| 401 | 402 | 403 | 404 |
|---|---|---|---|
| "CURRENT PORT NUMBER", | "INITIAL PORT NUMBER", | "OFF OR ON", | "APPLICATION NAME" |
| "10515", | "515", | "ON", | "LPD" |
| "9100", | "9100", | "OFF", | "RAW" |
| "161", | "161", | "ON", | "SNMP" |
| "21", | "21", | "OFF", | "FTP" |

| "PORT NUMBER"[801], | "OFF OR ON"[802], | "APPLICATION NAME"[803], | "URL"[804] |
|---|---|---|---|
| "515", | "ON", | "LPD" | "" |
| "9100", | "OFF", | "RAW" | "" |
| "161", | "ON", | "SNMP" | "" |
| "21", | "OFF", | "FTP" | "" |
| "80", | "ON", | "RUI" | "/" |
| "80", | "OFF", | "IPP" | "/ipp" |
| "80", | "ON", | "WSD" | "/wsd" |
| "80", | "ON", | "BMLINKS" | "/bmlinks" |

NETWORK APPARATUS, CONTROL METHOD THEREFOR, AND STORAGE MEDIUM

BACKGROUND OF THE INVENTION

1. Field of the Invention

The present invention relates to a network apparatus for transmitting/receiving a packet to/from an external apparatus connected thereto via a network, a control method therefor, and a storage medium.

2. Description of the Related Art

Network communication monitoring software used to analyze various communication errors such as a network disconnection and a sequence error in a network communication system in which a plurality of network apparatuses are connected to each other has been developed.

However, a process of connecting a PC provided with such software to a network apparatus each time a network failure occurs and causing the PC to monitor network communication and analyze a communication error is time-consuming and costly.

A technique for rapidly correcting a communication error in a network apparatus without using a PC provided with monitoring software has been proposed. That is, a system for causing a network apparatus to capture a packet transmitted/received via a network and monitor the captured packet is disclosed (see, for example, Japanese Patent Laid-Open No. 2004-362012). It is expected that an increasing number of such apparatuses will be used.

In the above-described monitoring method, if a network apparatus rejects a processing request transmitted from an external apparatus, the fact is output as error information. The reason why the network apparatus rejects the processing request transmitted from the external apparatus is that, for example, the IP address of a request source from which the processing request is transmitted is registered as a rejection IP address to be filtered, or an application of a request destination to which the processing request is transmitted is set to an OFF state.

For example, in a case that the processing request is rejected due to the fact that the IP address of a request source from which the processing request is transmitted is registered as a rejection IP address to be filtered, an application of a request destination to which the processing request is transmitted performs IP address filtering processing. Accordingly, output error information can include information about the application of the request destination to which the processing request is transmitted.

However, if the application (for example, LPD or Raw) is set to the OFF state, the processing request transmitted from the external apparatus cannot be delivered to the application. In this case, the application cannot determine that the processing request has been rejected. Furthermore, if the application is set to the OFF state, the network apparatus cannot monitor a port number corresponding to the application of the network apparatus. In this case, the network apparatus cannot know to which of applications of the network apparatus the processing request has been transmitted.

Accordingly, after the processing request transmitted from the external apparatus has been rejected, it takes a long time to analyze a cause of the rejection. Furthermore, it is difficult for the user of the network apparatus to find a cause of the rejection, which is inconvenient for the user.

SUMMARY OF THE INVENTION

The present invention provides a network apparatus capable of, in a case that applications of the network apparatus are in an OFF state and a processing request transmitted from an external apparatus is rejected by the network apparatus, determining to which of the applications of the network apparatus the processing request has been transmitted, a control method therefor, and a storage medium.

There is provided a network apparatus for receiving a processing request transmitted from an external apparatus connected thereto via a network. The network apparatus includes: a detection unit configured to detect that processing corresponding to the transmitted processing request has not been performed; a specifying unit configured to, in a case where the detection unit detects that the processing corresponding to the transmitted processing request has not been performed, recognize a port number of a request destination of the transmitted processing request, and specify an application corresponding to the recognized port number as an application of a request destination of the transmitted processing request; a determination unit configured to determine whether the application specified by the specifying unit is in an ON or OFF state; and an output unit configured to, in a case where the detection unit detects that the processing corresponding to the transmitted processing request has not been performed, and the application specified by the specifying unit is in the OFF state, output error information including information indicating the specified application.

There is provided a control method for a network apparatus for receiving a processing request transmitted from an external apparatus connected thereto via a network. The control method includes: detecting that processing corresponding to the transmitted processing request has not been performed; in a case where it is detected that the processing corresponding to the transmitted processing request has not been performed, recognizing a port number of a request destination of the transmitted processing request and specifying an application corresponding to the recognized port number as an application of a request destination of the transmitted processing request; determining whether the specified application is in an ON or OFF state; and in a case where it is detected that the processing corresponding to the transmitted processing request has not been performed and the specified application is in the OFF state, outputting error information including information indicating the specified application.

Further features of the present invention will become apparent from the following description of exemplary embodiments with reference to the attached drawings.

BRIEF DESCRIPTION OF THE DRAWINGS

FIG. 2 is a diagram illustrating a configuration of a network communication system in which the image forming apparatuses illustrated in FIG. 1 are connected to each other.

FIG. 3 is a diagram illustrating a first example of a port management table stored in the image forming apparatus illustrated in FIG. 1.

DESCRIPTION OF THE EMBODIMENTS

Embodiments of the present invention will be described in detail below with reference to the accompanying drawings.

Figure 1:
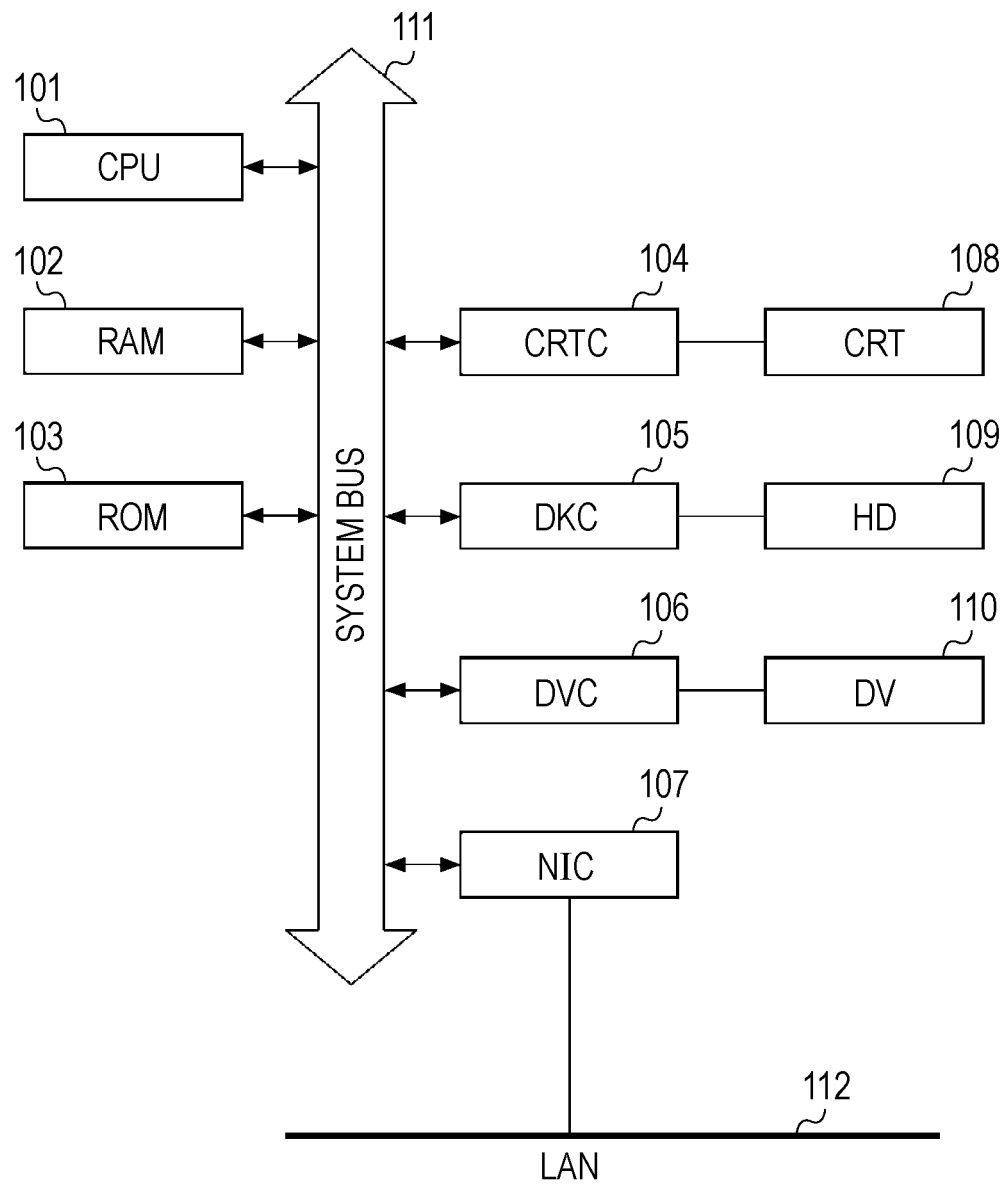
FIG. 1 is a block diagram of an image forming apparatus that is a network apparatus according to an embodiment of the present invention.

FIG. 1 is a block diagram of an image forming apparatus that is a network apparatus according to an embodiment of the present invention.

Referring to FIG. 1, an image forming apparatus includes a CPU 101 for executing a program stored in a ROM 103 and performing overall control of devices connected to a system bus 111.

A RAM 102 functions as the main memory and work area of the CPU 101 and a backup RAM for storing setting values of devices. A CRT controller (CRTC) 104 performs display control of a CRT display (CRT) 108. Using the CRT 108, a user can check the status of job processing executed in the image forming apparatus and input various instructions.

A disk controller (DKC) 105 controls a hard disk (HD) 109 for storing images and various pieces of user data. A device controller (DVC) 106 controls a printer (DV) 110.

A network interface card (NIC) 107 controls the communication via a LAN 112 between an external apparatus (for example, a personal computer) on a network and the image forming apparatus.

The CPU 101 functions as a monitoring unit for monitoring a packet transmitted between the external apparatus and the image forming apparatus. Furthermore, the CPU 101 functions as a detection unit for detecting a rejection packet that is transmitted from the image forming apparatus in response to a processing request transmitted from the external apparatus. Still furthermore, the CPU 101 functions as a specifying unit for recognizing a port number of a request destination to which the processing request is transmitted from the external apparatus and specifying an application corresponding to the recognized port number as an application of a request destination of the processing request.

The HD 109 functions as a management unit for associating a initial port number set as a port number corresponding to a predetermined application and a current port number set as a port number corresponding to the predetermined application with each other and managing them. The CPU 101 functions as a determination unit for determining whether an application of a request destination to which a processing request is transmitted from the external apparatus is in an ON or OFF state. Furthermore, the CPU 101 functions as an output unit for, in a case that the CPU 101 detects that a rejection packet has been transmitted from the image forming apparatus in response to a processing request transmitted from the external apparatus, outputting error information including information about an application of a request destination to which the processing request is transmitted. For example, the CPU 101 outputs error information by causing the CRT display (CRT) 108 functioning as a display unit to display the error information.

A more detailed description will be made below.

FIG. 2 is a diagram illustrating a configuration of a network communication system in which the image forming apparatuses illustrated in FIG. 1 are connected to each other.

Referring to FIG. 2, in the network communication system, a PC 201 is connected to a plurality of image forming apparatuses 202 and 203 via a network 204. Each arrow illustrated in FIG. 2 represents the flow of data or an instruction.

The PC 201 transmits a print job to the image forming apparatuses 202 and 203, and can monitor the statuses of the image forming apparatuses 202 and 203 using an SNMP monitoring protocol or the like.

A Raw application for performing print processing using Raw that is one of print protocols is set to an ON state in the image forming apparatus 202 and an OFF state in the image forming apparatus 203. If the PC 201 requests the Raw application of the image forming apparatus 202 to perform print processing (1), the reception of a print job is permitted and print processing is performed in the image forming apparatus 202 (2). On the other hand, if the PC 201 requests the Raw application of the image forming apparatus 203 to perform print processing (3), the reception of a print job is rejected and print processing is not performed in the image forming apparatus 203 (4).

In this embodiment, print processing performed using the Raw application has been described. However, a print application using a protocol other than Raw may be used. Alternatively, a monitoring application such as SNMP may be used.

The numbers of image forming apparatuses and PCs are not limited to those included in the network communication system illustrated in FIG. 2. A single image forming apparatus and a plurality of PCs may be used.

FIG. 3 is a diagram illustrating a first example of a port management table stored in the image forming apparatus illustrated in FIG. 1.

Referring to FIG. 3, a port management table includes a port number 301 representing each port number that may be used in an image forming apparatus, an application status 302 representing an status (ON or OFF) of an application associated with the port number 301, and an application name 303 representing the name of the application associated with the port number 301.

In the case of a known application such as LPD or Raw, a port number and an application name are defined in advance, and are therefore stored in advance in a management table as fixed information. The application status 302 is updated when each application stored in an NVRAM is set to an OFF or ON state.

The port management table illustrated in FIG. 3 is stored in advance as fixed information. However, each application may automatically register a port number used, an application status (ON or OFF), and an application name.

Figures 4, 5:
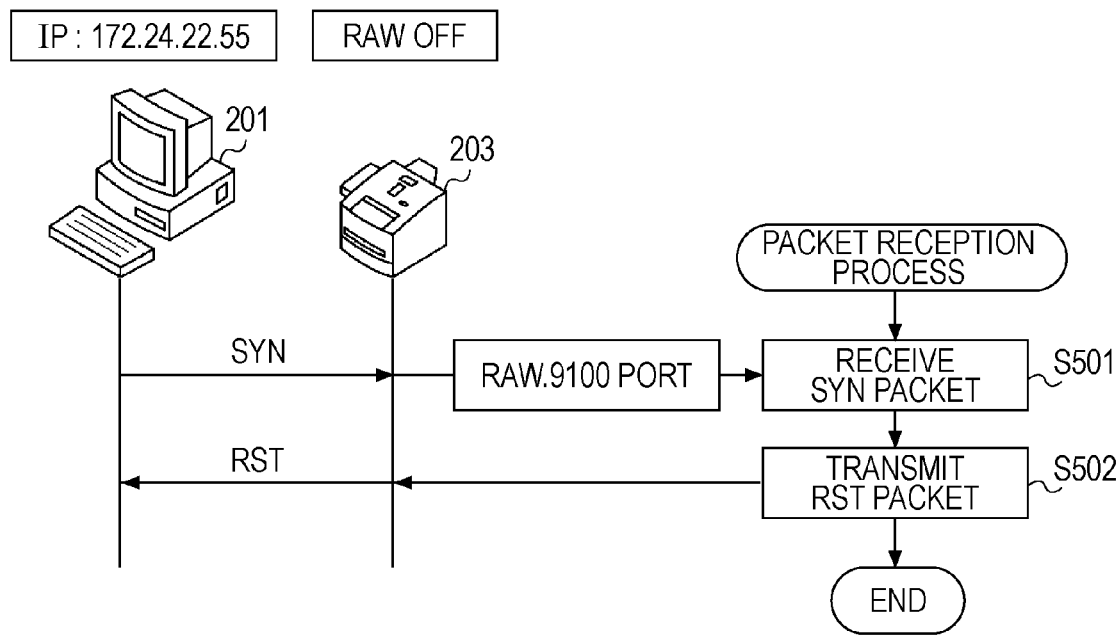
FIG. 4 is a diagram illustrating a port management table stored in the image forming apparatus illustrated in FIG. 1 in which a port number can be changed by an application.
FIG. 5 is a diagram illustrating a first embodiment of a sequence of the network communication system illustrated in FIG. 2.

FIG. 4 is a diagram illustrating a port management table stored in the image forming apparatus illustrated in FIG. 1 in which a port number can be changed by an application.

The port management table illustrated in FIG. 4 includes a port number 401 representing each current port number (a second port number), a port number 402 representing each initial port number (a first port number), an application status 403 representing a current status (ON or OFF) of an application associated with the port number 401, and an application name 404 representing a name of the application associated with the port number 401. The initial port number is a port number set at the factory. However, a port number set at another time may be managed as the initial port number.

FIG. 5 is a diagram illustrating a first embodiment of a sequence of the network communication system illustrated in FIG. 2. A program for performing processing in accordance with a flowchart illustrated in the drawing is loaded from the ROM 103 into the RAM 102 and is then executed under the control of the CPU 101.

The IP address of the PC 201 is set to 172.24.22.55. In the image forming apparatus 203, a Raw application is set to an OFF state.

In step S501, the image forming apparatus 203 receives from the PC 201 an SYN packet that is a connection request compliant with the TCP/IP protocol. The SYN packet is transmitted to a port having a port number 9100 corresponding to the Raw application. In step S502, the image forming apparatus 203 transmits to the PC 201 an RST packet that is a connection rejection packet compliant with the TCP/IP protocol.

Since the Raw application is set to the OFF state in the image forming apparatus 203, the RST packet is transmitted from the image forming apparatus 203. If the Raw application is set to an ON state, the image forming apparatus 203 notifies the PC 201 that the reception of the connection request has been permitted by transmitting an ACK packet to the PC 201.

FIG. 5 illustrates a process of transmitting a print request to the Raw application. However, in the above-described process, another printing protocol such as LPD or a monitoring protocol such as SNMP may be used. If SNMP is used, a UDP packet is used. Accordingly, in this case, a SNMP packet representing a print request is directly transmitted from the PC 201 instead of an SYN packet, and the image forming apparatus notifies the PC 201 of the occurrence of an error by transmitting no packet to the PC 201.

Figure 6:
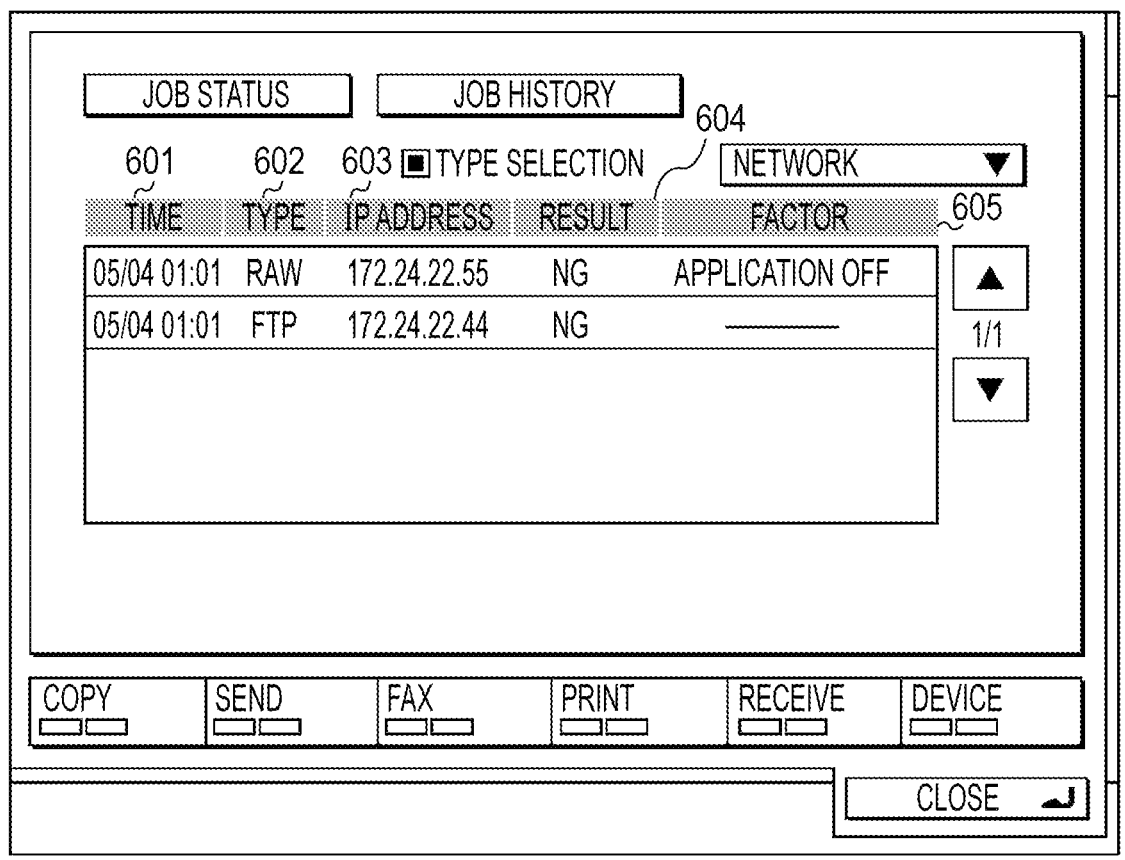
FIG. 6 is a diagram illustrating an exemplary screen of a CRT display illustrated in FIG. 1 on which error information is displayed.

FIG. 6 is a diagram illustrating an exemplary screen of the CRT display (CRT) 108 illustrated in FIG. 1 on which error information is displayed.

Referring to FIG. 6, on a display screen, a time 601 at which a processing request has been received from an external apparatus, an application type 602 of a request destination to which the processing request has been transmitted, and an IP address 603 of the external apparatus that is a request source from which the processing request has been transmitted are displayed. Furthermore, a result 604 indicating whether the reception of the processing request has been rejected is displayed. If the reception of the processing request is rejected, "NG" is displayed. If the reception of the processing request is not rejected and processing is normally performed, "OK" is displayed.

Furthermore, a cause 605 representing the cause of the rejection of the processing request is displayed. In this embodiment, if the reception of the processing request is rejected because the application of the request destination to which the processing request is transmitted is set to the OFF state, "application OFF" is displayed. If the reception of the processing request is rejected due to other causes, a dash "-" is displayed.

Figure 7:
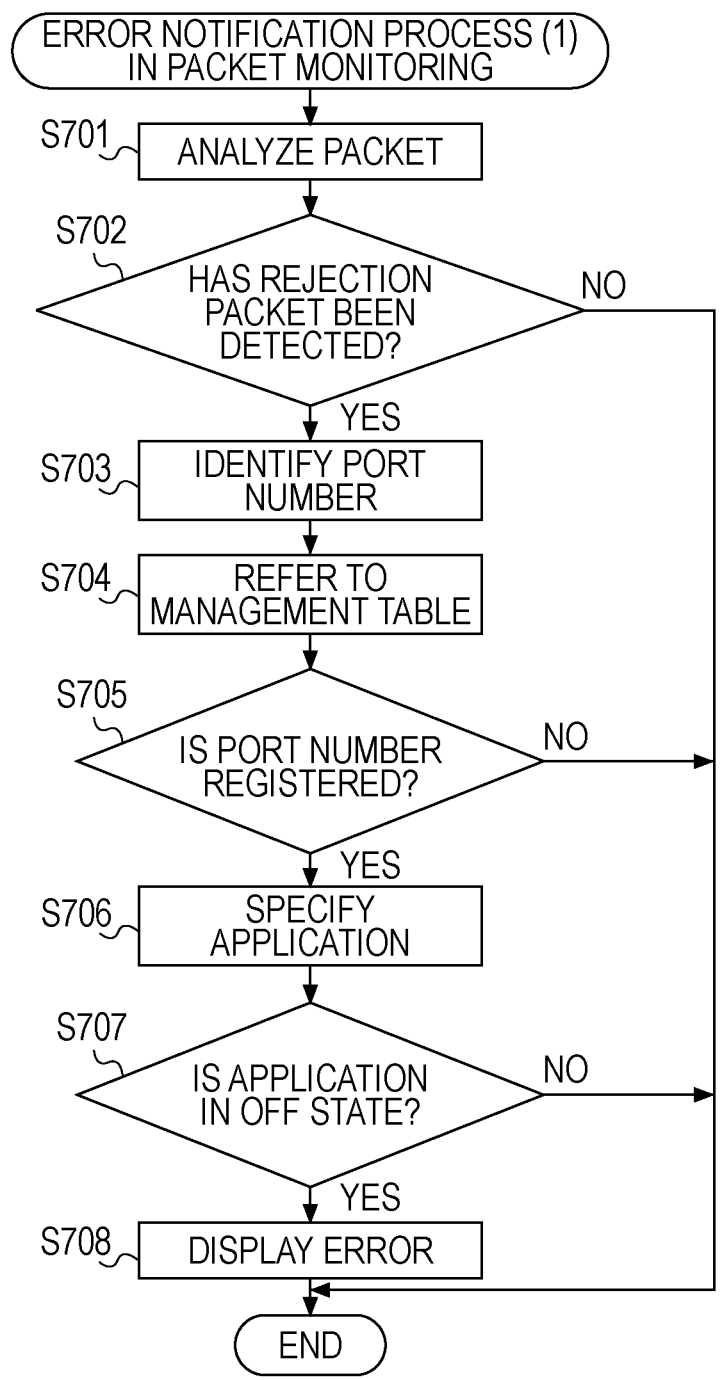
FIG. 7 is a flowchart illustrating a first embodiment of an error notification process in packet monitoring performed by the image forming apparatus illustrated in FIG. 1.

FIG. 7 is a flowchart illustrating a first embodiment of an error notification process in packet monitoring performed by the image forming apparatus illustrated in FIG. 1. A program for performing processing in accordance with the flowchart illustrated in the drawing is loaded from the ROM 103 into the RAM 102 and is then executed under the control of the CPU 101.

Referring to FIG. 7, in step S701, a network monitoring module (the CPU 101) included in an image forming apparatus monitors a packet transmitted between the PC 201 and the image forming apparatus.

In step S702, the network monitoring module detects whether the image forming apparatus has transmitted an RST (connection rejection) packet in response to a job processing request transmitted from the PC 201.

If it is detected in step S702 that the image forming apparatus has transmitted the RST (connection rejection) packet, the process proceeds to step S703. If it is detected in step S702 that the image forming apparatus has not transmitted the RST (connection rejection) packet, the process ends.

The connection rejection packet is a packet indicating that the image forming apparatus has received the connection request (processing request) from the PC 201 and rejected the connection to the PC 201. The processing request is rejected in a case that an application is set to the OFF state as described previously, or in a case that the IP address of the external apparatus from which the processing request is transmitted is registered as a rejection IP address to be filtered.

In step S703, the port number of a request destination to which the processing request has been transmitted is identified. In step S704, the image forming apparatus refers to the management table illustrated in FIG. 3 so as to detect whether the port number identified in step S703 is registered in the management table.

In step S705, it is determined whether the above-described port number is registered. If the above-described port number is not registered, the process ends. If the above-described port number is registered, the process proceeds to step S706. In step S706, the image forming apparatus refers to the management table illustrated in FIG. 3 and specifies an application corresponding to the port number identified in step S703. In step S707, it is determined whether the application specified in step S706 is in the ON or OFF state using the management table illustrated in FIG. 3. If the application specified in step S706 is in the OFF state, the process proceeds to step S708. If the application specified in step S706 is not in the OFF state, the process ends.

In step S708, error information including the name of the application specified in step S706 is displayed on the screen of the CRT 108 as illustrated in FIG. 6.

In steps S704, S706, and S707, in the image forming apparatus, the management table illustrated in FIG. 4 may be referred instead of the management table illustrated in FIG. 3. If the management table illustrated in FIG. 4 is referred and the port number of a request destination to which a processing request is transmitted is an initial port number, the following process may be performed. That is, an application corresponding to a current port number associated with the port number of a request destination of the processing request may be specified as an application of a request destination of the processing request. The name of the specified application is displayed on the screen of the CRT 108.

In the above description, if it is determined that the application specified in step S706 is not in the OFF state, that is, in the ON state, the process ends. In reality, however, if the application of the request destination to which the processing request is transmitted is set to the ON state, the following process is performed. That is, for example, the reason why the processing request is rejected in spite of the fact that the application of the request destination to which the processing request is transmitted is in the ON state is that the IP address of a request source from which the processing request is transmitted is registered as a rejection IP address to be filtered. In this case, since the application of the request destination to which the processing request is transmitted determines whether it is required to reject the processing request after receiving the processing request packet, error information based on information directly transmitted from the application is displayed on the screen of the CRT 108.

Figures 8, 9:
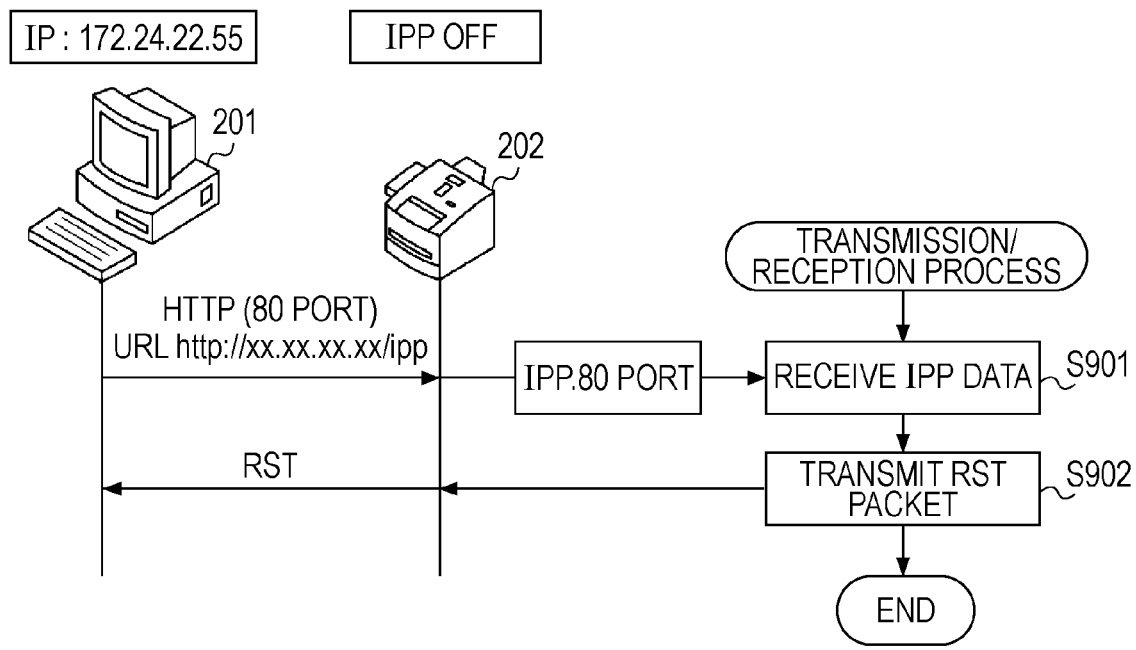
FIG. 8 is a diagram illustrating a second example of a port management table stored in the image forming apparatus illustrated in FIG. 1.
FIG. 9 is a diagram illustrating a second embodiment of a sequence of the network communication system illustrated in FIG. 2.

FIG. 8 is a diagram illustrating a second example of a port management table stored in the image forming apparatus illustrated in FIG. 1.

The port management table illustrated in FIG. 8 includes a port number 801 representing each port number that may be used in the image forming apparatus, an application status 802 representing the current status (ON or OFF) of an application associated with the port number 801, an application name 803 representing the name of the application associated with the port number 801, and a service URL 804 for each application.

A port number may be included in advance in the management table illustrated in FIG. 8 as fixed information. Alternatively, each application may automatically register a port number in the management table illustrated in FIG. 8.

FIG. 9 is a diagram illustrating a second embodiment of a sequence of the network communication system illustrated in FIG. 2. A program for performing processing in accordance with a flowchart illustrated in the drawing is loaded from the ROM 103 into the RAM 102 and is then executed under the control of the CPU 101.

Referring to FIG. 9, the IP address of the PC 201 is set to 172.24.22.55. In the image forming apparatus 202, an IPP application is set to an OFF state.

In step S901, the image forming apparatus 202 receives from the PC 201 a packet that is a connection request compliant with the HTTP protocol. The packet is transmitted to a port having a port number 80 corresponding to the IPP application. The HTTP header includes a service URL (URL information). In step S902, the image forming apparatus 202 transmits to the PC 201 an RST packet that is a connection rejection packet compliant with the TCP/IP protocol.

Since the IPP application is set to the OFF state in the image forming apparatus 202, the image forming apparatus 202 transmits to the PC 201 the RST packet compliant with the TCP/IP protocol.

If the IPP application is set to an ON state, the image forming apparatus 202 notifies the PC 201 that the reception of the connection request has been permitted by transmitting an HTTP normal response to the PC 201.

FIG. 9 illustrates a process of transmitting a print request to the IPP application. However, in the above-described process, an application corresponding to another protocol may be used.

Figure 10:
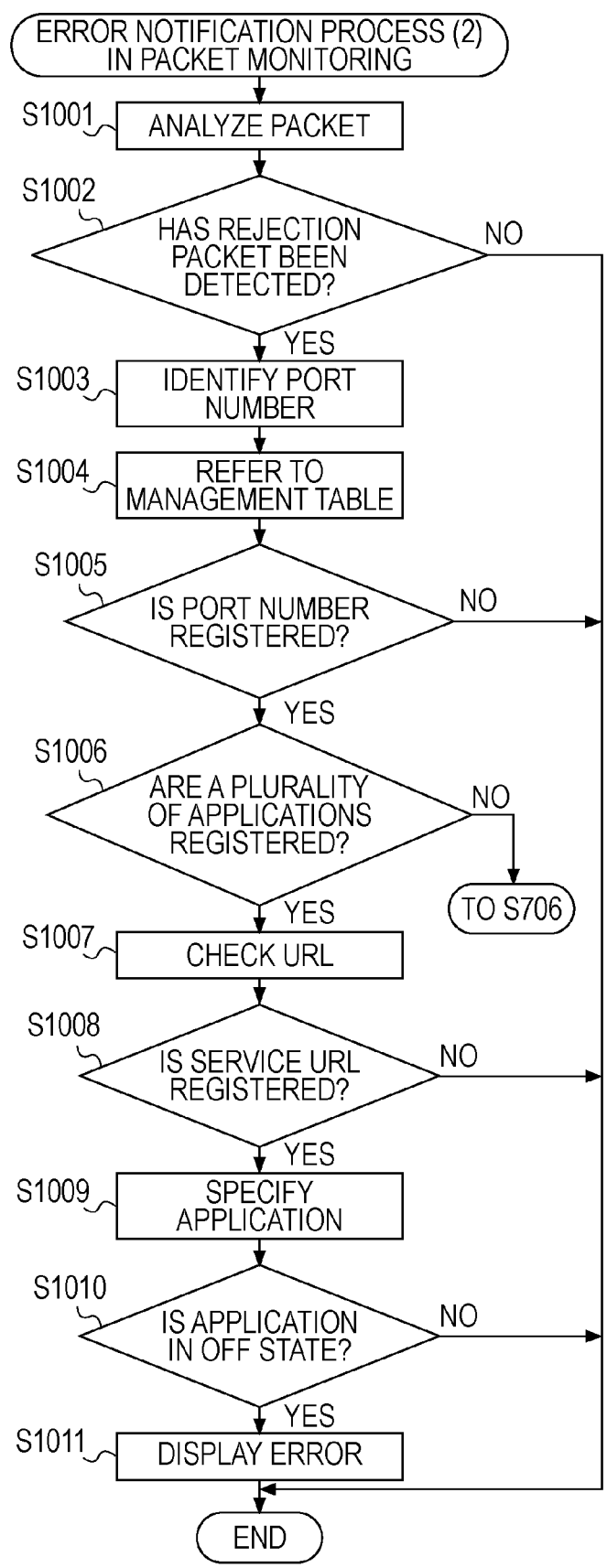
FIG. 10 is a flowchart illustrating a second embodiment of an error notification process in packet monitoring performed by the image forming apparatus illustrated in FIG. 1.

FIG. 10 is a flowchart illustrating a second embodiment of an error notification process in packet monitoring performed by the image forming apparatus illustrated in FIG. 1. A program for performing processing in accordance with the flowchart illustrated in the drawing is loaded from the ROM 103 into the RAM 102 and is then executed under the control of the CPU 101.

Referring to FIG. 10, in step S1001, a network monitoring module (the CPU 101) included in an image forming apparatus monitors a packet transmitted between the PC 201 and the image forming apparatus.

In step S1002, the network monitoring module detects whether the image forming apparatus has transmitted an RST (connection rejection) packet in response to a job processing request transmitted from the PC 201.

If it is detected in step S1002 that the image forming apparatus has transmitted the RST (connection rejection) packet, the process proceeds to step S1003. If it is detected in step S1002 that the image forming apparatus has not transmitted the RST (connection rejection) packet, the process ends.

In step S1003, the port number of a request destination to which the processing request is transmitted is identified. In step S1004, the image forming apparatus refers to the management table illustrated in FIG. 8 so as to detect whether the port number identified in step S1003 is registered in the management table.

In step S1005, it is determined whether the above-described port number is registered. If the above-described port number is registered, the process proceeds to step S1006. If the above-described port number is not registered, the process ends.

In step S1006, it is determined whether a plurality of applications are associated with a corresponding port number and are registered. If a plurality of applications are registered, the process proceeds to step S1007. On the other hand, if a plurality of applications are not registered, that is, a single application is registered, the process proceeds to step S706 illustrated in FIG. 7.

In step S1007, a service URL transmitted from the PC 201 is checked. In step S1008, if it is determined that there is a service URL matching the service URL transmitted from the PC 201 in the management table, the process proceeds to step S1009. If it is determined in step S1008 that there is no service URL matching the service URL transmitted from the PC 201 in the management table, the process ends.

In step S1009, the image forming apparatus refers to the management table illustrated in FIG. 8 and specifies an application associated with the service URL checked in step S1007.

In step S1010, it is determined whether the application specified in step S1009 is in the ON or OFF state. If the application associated with the URL checked in step S1007 is in the OFF state, the process proceeds to step S1011. If the application associated with the URL checked in step S1007 is not in the OFF state, the process ends. In step S1011, error information including the name of the application specified in step S1009 is displayed on the screen of the CRT 108 as illustrated in FIG. 6.

Exemplary embodiments have been described in detail, but the present invention is not limited thereto. The present invention can adopt embodiments in the form of a system, an apparatus, a method, a program, a storage medium (recording medium), and the like. More specifically, the present invention may be applied to a system composed of a plurality of devices or to an apparatus composed of a single device.

The present invention may be achieved in such a manner that a program of software for implementing the functions of the above-described embodiments (a program corresponding to the flowcharts illustrated in the drawings) is directly or remotely supplied to a system or an apparatus, and a computer of the system or apparatus reads out the supplied program code and executes the read program code.

Accordingly, a program code itself that is installed on a computer to cause the computer to achieve the functional processing of the present invention realizes the present invention. That is, the present invention also includes a computer program itself for implementing the functional processing of the present invention.

In this case, instead of the computer program, an object code, a program executed by an interpreter, or script data provided for an OS may be adopted, as long as it has the functions of the computer program.

Recording media for providing a program include a floppy (registered trademark) disk, a hard disk, an optical disc, a magneto-optical disk, an MO, a CD-ROM, a CD-R, a CD-RW, a magnetic tape, a nonvolatile memory card, a ROM, and a DVD (DVD-ROM or DVD-R).

A program may be provided by connecting a client computer to an Internet home page via the browser of the client computer, and downloading from the home page to a storage medium such as a hard disk a computer program itself of the present invention or a compressed file with an automatic installing function. A program may also be provided in such a manner that a program code configuring the program of the present invention is divided into a plurality of files, and the files are individually downloaded from different home pages. That is, the present invention also includes a WWW server that allows a plurality of users to download the program files for implementing the functional processing of the present invention in a computer.

The program of the present invention may be encrypted, stored in a storage medium such as a CD-ROM, and distributed to users. A user who satisfies predetermined conditions may be allowed to download decryption key information from a home page via the Internet. That is, the user may use the key information to execute the encrypted program and install the program on a computer.

The computer executes the read program to achieve the functions of the above-described embodiments. Furthermore, an OS or the like running on the computer may perform part or all of actual processing under instructions of the program to achieve the functions of the above-described embodiments.

Still furthermore, the program read out from the recording medium may be written to a memory provided in a function expansion board inserted into the computer or in a function expansion unit connected to the computer. Subsequently, the program may be executed to achieve the functions of the above-described embodiment. That is, a CPU or the like provided in the function expansion board or the function expansion unit may perform part or all of actual processing under instructions of the program.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-030421 filed Feb. 12, 2008, which is hereby incorporated by reference herein in its entirety.

What is claimed is:

1. A network apparatus communicating with an external apparatus via a network, the network apparatus comprising:
   a reception unit configured to receive a processing request packet including a port number from the external apparatus, the processing request packet indicating that the external apparatus requests the network apparatus to perform processing;
   a transmitting unit configured to transmit a rejection packet including the port number to the external apparatus in response to the processing request packet, the rejection packet indicating that the network apparatus rejects a request of the external apparatus;
   a monitoring unit configured to monitor packets transmitted between the external apparatus and the network apparatus;
   a determination unit configured to determine whether an application which is specified based on the port number in the rejection packet is activated or not, in response to detecting that the rejection packet is transmitted to the external apparatus while the monitoring unit monitors the packets; and
   an output unit configured to, in a case where the determination unit determines that the application is not activated, output error information including information indicating the application,
   wherein the error information output by the output unit is different from error information which is output in a case where the application is activated.

2. The network apparatus according to claim 1, wherein, in a case where the determination unit determines that the application is not activated, the output unit determines whether a reason why the processing corresponding to the received processing request has not been performed is that the specified application is not activated, and outputs the error information on the basis of a result of the determination.

3. The network apparatus according to claim 1, further comprising:
   a managing unit configured to manage a plurality of applications, which is installed in the network apparatus, by relating each of the plurality of applications to a corresponding port number; and
   a specifying unit configured to specify, from among the plurality of applications managed by the managing unit, an application corresponding to the port number included in the received processing request,
   wherein the management unit associates a first port number initially set as a port number corresponding to a predetermined application included in the network apparatus and a second port number currently set as a port number corresponding to the predetermined application with each other and manage them, and
   wherein, in a case where the port number included in the received processing request is the first port number, the specifying unit specifies an application corresponding to the second port number associated with the first port number as an application of a request destination of the received processing request.

4. The network apparatus according to claim 3, wherein, in a case where a port number of a request destination of the received processing request corresponds to a plurality of applications, the specifying unit specifies an application of a request destination of the transmitted processing request using URL information received from the external apparatus.

5. The network apparatus according to claim 1, further comprising a display unit configured to display the error information, and
   wherein the output unit outputs the error information by causing the display unit to display the error information.

6. The network apparatus according to claim 3,
   wherein the external apparatus requests the network apparatus to perform print processing by transmitting the processing request to the network apparatus, and
   wherein the application specified by the specifying unit is an application for performing print processing in response to the received processing request.

7. The network apparatus according to claim 1, wherein the processing request packet and the rejection packet are transmitted and received in accordance with the Transmission Control Protocol (TCP).

8. The network apparatus according to claim 7, wherein the processing request packet is a SYN packet.

9. The network apparatus according to claim 7, wherein the rejection packet is an RST packet.

10. The network apparatus according to claim 7, wherein the output unit causes a display unit to display error information.

11. The network apparatus according to claim 10, wherein the output unit displays the error information in a display form with which a user can distinguish the error information from error information which is output in a case where the determination unit determines that the application is activated.

12. The network apparatus according to claim 1, wherein the application is an application for printing.

13. The network apparatus according to claim 12, wherein the application is a RAW application or a LPD application.

14. The network apparatus according to claim 1, wherein, in a case where the application rejects the processing request packet, the output unit outputs error information of different type from the error information.

15. The network apparatus according to claim 14, wherein, in a case where an IP address of a transmission source included in the processing request packet is a rejection address, the application rejects the processing request packet.

16. The network apparatus according to claim 1, wherein information including information indicating the application is a name of an application.

17. A control method for a network apparatus communicating with an external apparatus via a network, the control method comprising:
 receiving a processing request packet including a port number from the external apparatus, the processing request packet indicating that the external apparatus requests the network apparatus to perform processing;
 transmitting a rejection packet including the port number to the external apparatus in response to the processing request packet, the rejection packet indicating that the network apparatus rejects a request of the external apparatus;
 monitoring packets transmitted between the external apparatus and the network apparatus;
 determining whether an application which is specified based on the port number in the rejection packet is activated or not, in response to detecting that the rejection packet is transmitted to the external apparatus while monitoring the packets; and outputting, in a case wherein it is determined that the application is not activated, error information including information indicating the application,
 wherein the error information is different from error information which is output in a case where the application is activated.

18. A non-transitory computer readable medium containing computer-executable instructions for controlling a network apparatus communicating with an external apparatus via a network, the medium comprising:
 computer-executable instructions for receiving a processing request packet including a port number from the external apparatus, the processing request packet indicating that the external apparatus requests the network apparatus to perform processing;
 computer-executable instructions for transmitting a rejection packet including the port number to the external apparatus in response to the processing request packet, the rejection packet indicating that the network apparatus rejects a request of the external apparatus;
 computer-executable instructions for monitoring packets transmitted between the external apparatus and the network apparatus;
 computer-executable instructions for determining whether an application which is specified based on the port number in the rejection packet is activated or not, in response to detecting that the rejection packet is transmitted to the external apparatus while monitoring the packets; and
 computer-executable instructions for outputting, in a case wherein it is determined that the application is not activated, error information including information indicating the application,
 wherein the error information is different from error information which is output in a case where the application is activated.

\* \* \* \* \*